3,168,437
STABILIZED GRANULAR GYPSUM-PESTICIDAL COMPOSITION AND METHOD OF PREPARATION
Arthur L. Galloway, Mentor, Ohio, assignor to Diamond Alkali Company, Cleveland, Ohio, a corporation of Delaware
No Drawing. Filed Apr. 14, 1961, Ser. No. 102,939
26 Claims. (Cl. 167—42)

This invention relates to biologically active compositions of matter, and in particular to compositions for use in killing or preventing undesirable pests.

It is to be understood that as used hereinafter, the term "pesticide" or "pesticidal composition" is meant to refer to those toxicological compositions which are effective in killing or controlling the growth of plants, insects, microorganisms, fungi, bacteria and the like, and it is intended to refere broadly to those compositions commonly known as inecticide, bactericide, fungicide, nematocides, herbicides and the like.

Various types of pesticides have been proposed and are currently in use. These materials are characterized by their ability to attack or exterminate certain undesirable species of pests, their action being selective in that desirable species are left substantially unaffected and in a more or less healthy or vigorous state. The pesticidal compositions which have been used include both inorganic and organic chemicals and compositions, some of the more common materials being the following:

DDT[2,2-bis-(p-chlorophenyl)-1,1,1-trichloroethane]
2,4-D (2,4-dichlorophenoxyacetic acid)
2,4-D isopropyl ester
2,4,5-T (2,4,5-trichlorophenoxyacetic acid)
Dieldrin (1,2,3,4,10,10 - hexachloro-exo-6,7-epoxy-1,4,4a, 5,6,7,8,8a - octahydro-1,4,5,8-endo,exo-dimethanonaphthalene)
Sesone (sodium 2,4-dichlorophenoxyethyl sulfate)
Endrin (1,2,3,4,10,10 - hexachloro-exo-6,7,-epoxxy-1,4,4a, 5,6,7,8,8a - octahydro - 1,4,5,8 - endo,endo - dimethano-naphthalene)
Heptachlor (1,4,5,6,7,8,8 - heptachloro - 3a, 4,7, 7a-tetrahydro-4,7-endo-methanoindene)
Malathion [S - (1,2 - dicarbethoxyethyl) - O,O-dimethyl-phosphorodithioate]
Parathion (O-p-nitrophenyl O,O-diethyl phosphorothioate)
DDVP (dimethyl dichlorovinyl phosphate)
Ovex or Ovotron (p-chlorophenyl-p-chlorobenzenesulfonate)
Lindane (gamma-1,2,3,4,5,6-hexachlorocyclohexane)
Natrin (sodium 2,4,5-trichlorophenoxyethyl sulfate)
3,4-dichlorotetrahydrothiophene 1,1-dioxide
3,3,4,4-tetrachlorotetrahydrothiophene 1,1-dioxide
Dimethyl tetrachloroterephthalate One method of applying pesticidal agents of the type described above involves dissolving the agent in an appropriate solvent, with or without a surfactant, such as water, kerosene, fuel oil, toluene, xylene, etc., and applying the resulting solution, usually in the form of a spray, to the area desired to be treated. Alternatively, the pesticidal agent may be mixed with a pulverulent diluent, such as talc, finely divided diatomaceous earth, ground pumice, fuller's earth, whiting, etc., and the resulting active dust applied to the areas to be treated. While these methods are suitable for application at close range and where there is no danger of contamination of adjacent areas in which certain vegetation, insects, microorganisms or the like might be damaged, there has always been a distinct hazard in that particles of active spray or dust may be carried over onto adjacent areas with harmful effects, due either to the method of application or to the fact that the particles of active agent are miscarried by wind or air currents. Additionally, sprays or dusts cannot be applied to areas lying under heavy foilage, as the fine particles of the spray or dust will not penetrate the foilage. Progress in the application of pesticidal agents by aircraft has been retarded because of the above-mentioned difficulties.

Attempts have been made to solve these problems by incorporating the pesticidal agents into or upon pellets consisting essentially of fuller's earth, natural clays (e.g., attaclay, pumice, calcined diatomaceous earth), or other pelletized powders. Such pellets lend themselves well to controlled distribution by aircraft. However, several disadvantages attend the use of the above-designated materials in pellets. The pellets are adversely affected by very high or very low humidity. The toxicant must be added in solution, and the usual solvents are expensive, toxic and hard to remove. After removal of the solvent, the toxicant is non-uniformly distributed on the surface of the pellets. Fines, produced during treatment with the toxicant solution, cannot be used in preparing subsequent batches. Certain toxicants are sensitive to the commonly used pellet bases. Finally, the physical characteristics of the pellets are not easily changed to fit varying conditions.

Many of these disadvantages were eliminated by the developoment of plaster granules, described in my co-pending application, Serial No. 70,448, filed November 21, 1960, new U.S. Patent No. 3,056,723. These granules are physically stable under all conditions of humidity. The toxicant, in the solid state, may be mixed with the solid plaster before pelletizing, thus eliminating the use of solvents. The fines can be recirculated to the granulator and used again. The plaster is chemically non-reactive with the toxicants used.

Plaster granules are most useful in situations where a slowly disintegrating granule, or one which releases the active ingredient primarily by a leaching process, is desired. The addition of a swelling agent, such as bentonite, is necessary to produce a plaster granule which disintegrates rapidly in water.

It is the object of the present invention to provide a method for preparing, without the use of solvents, an inexpensive pelletized biologically active formulation, stable to varying climatic conditions, suitable for use with a wide variety of biologically active materials, in which the toxicant is intimately and uniformly distrbiuted and readily released by rapid disintegration of the pellets upon contact with water.

This object and others will become apparent to those skilled in the art from the description of the invention which follows.

By the method of this invention, a mixture of gypsum (calcium sulfate dihydrate, $CaSO_4 \cdot 2H_2O$), a material with which calcium sulfate forms a double salt or addition compound (e.g., ammonium sulfate, potassium sulfate, aluminum sulfate, urea), and a biologically active substance, such as a pesticidal agent, is treated with just enough water to effect the formation of pellets containing the biologically active material incorporated therein. If desired, a portion of the gypsum may be replaced with an anionic surfactant such as Nekal BX-78 (sodium salt of butylated naphthalenesulfonic acid) or Nacconol SW (sodium alkyl aryl sulfonate), a swelling agent such as bentonite, wheat flour, wood flour or the like, a material for increasing acidity (e.g., sodium hydrogen sulfate, sodium alum, other alums), or a dispersing agent (e.g. Marasperse N, a sodium lignosulfonate). The pellets thus formed are hard and are stable to ordinary atmospheric conditions, but are easily disintegrated by water for maximum effectiveness of the active material.

An important feature of the invention is the possibility of formation of double salts or molecular compounds between the calcium sulfate and the added material. With ammonium sulfate or potassium sulfate, calcium sulfate forms double salts commonly known as "syngenites." At ordinary temperatures, two such compounds can be formed: a "mono-salt," $M_2SO_4 \cdot CaSO_4 \cdot H_2O$ (M=K or $NH_4$), and a "penta-salt," $M_2SO_4 \cdot 5CaSO_4 \cdot H_2O$. Similarly, urea and calcium sulfate react to form an addition compound with the composition $CaSO_4 \cdot 4CO(NH_2)_2$, and there is evidence for the formation of an aluminum-calcium sulfate, $CaSO_4 \cdot Al_2(SO_4)_3 \cdot 18-2OH_2O$. Double salt formation is important in the formation of these granules because it promotes the "set" of the constituents into granular form.

The use of alum or aluminum sulfate in these formulations, either with calcium sulfate dihydrate alone or in combination with one of the other materials designated, is envisioned if a formulation of low pH is desirable. Such low-alkalinity conditions are necessary when the active ingredient is sensitive to alkalies (e.g., 3,3,4,4-tetrachlorotetrahydrothiophene 1,1-dioxide).

To form the pesticidal composition of the present invention, a mixture comprising about 25 to 90 parts by weight of calcium sulfate dihydrate, 1 to 70 parts by weight of ammonium sulfate, potassium sulfate, aluminum sulfate or urea, 0 to 20 parts by weight of a swellnig agent such as bentonite, 0 to 5 parts by weight of an acidic material such as sodium hydrogen sulfate, sodium alum, or other alums, 0 to 5 parts by weight of a surfactant, 0 to 5 parts by weight of a dispersing agent, and 1 to 30 parts by weight of the pesticide, either as technical grade material or as a dust concentrate or wettable powder, is sprayed with sufficient water to cause the formation of pellets. The mixture is stirred constantly during the addition of the water until pelletizing is produced. The moist mixture is then dried, crushed and screened to obtain granules of a size of between 10 and 80 mesh, i.e., granules which will pass through a screen having 10 openings per linear inch but will be retained on a screen having 80 openings per linear inch. Generally, granules of between 20 and 40 mesh or between 30 and 60 mesh are preferred for commercial application.

The amount of water added is critical in that there must be sufficient water to effect pelletizing but not enough to form a slurry or suspension of the dry materials. It is believed that those skilled in the art can readily ascertain the amount of water required in each instance. This amount of water will, of course, depend on the proportions of the dry ingredients in the mixture. Generally, it has been found that an amount of water equal to about 5 to 45% by weight of the dry ingredients, and usually in the range 10-35%, is sufficient.

It should be noted that this amount of water is often not enough to bring all of the added salt into solution. For this reason, a relatively small percentage of double salt is sometimes formed. However, enough double salt is present in the granule to provide the desired properties of hardness and water disintegration.

Mention has been made of the incorporation of a swelling agent (e.g., bentonite) into the granule. In the preparation of plaster granules, a rather high percentage of such a material, amounting to 40% or more of the dry constituents, is necessary to produce a pellet which will disintegrate rapidly in water. By contrast, the granules of the present invention generally disintegrate readily in water without the addition of any swelling agent. Incorporation of 10% or less of bentonite or a similar material may improve certain of these formulations, but more than that amount is rarely necessary or desirable.

Because of the relatively low cost of gypsum, ammonium sulfate, and potassium sulfate, the granules here described are often less expensive to manufacture than plaster granules. In addition, the granules contain nitrogen or potassium, both of which are beneficial to the soil.

The present method may be conveniently carried out in equipment similar to that which is commonly used by the fertilizer industry in producing granular fertilizers. The dry ingredients are added to a premixer wherein these various materials are blended. From the premixer, the dry mixture is metered into a wet rotating granulator wherein metered water is sprayed on the dry mixture. In the granulator, the mixture is formed into wet balls of about ⅛ inch in diameter, which are then passed to a rotary dryer operating at about 100–200° F. When the granulated material is dry, it is cooled and passed to a crusher and then screened to obtain the granulated particles of the desired size. The oversized particles are returned to the crusher while the undersized particles are returned to the wet granulator.

In order that those skilled in the art may better understand the composition of the present invention and the method in which it may be used, the following specific examples are given.

EXAMPLE 1

*Preparation of 50% wettable powder of dimethyl tetrachloroterephthalate*

| | Parts by weight |
|---|---|
| Dimethyl tetrachloroterephthalate (100% active basis) | 50.0 |
| Clay (attaclay, Tako or Pikes Peak) | 46.5 |
| Wetting agent—Nacconol SW 40% active (sodium alkyl aryl sulfonate) | 2.0 |
| Dispersing agent—Marasperse N | 1.5 |

The above mixture is finely ground in a ball mill, hammer mill, micropulverizer, air mill, roller mill, or the like.

This formulation is a fine powder which readily mixes with water to form a suspension.

EXAMPLE 2

A dry mix is made containing 8.60 lbs. of #1 Terra Alba ($CaSO_4 \cdot 2H_2O$), 6.60 lbs. of ammonium sulfate and 0.45 lb. of 50% wettable powder of dimethyl tetrachloroterephthalate. The components are mixed in a cement mixer, and then 743.3 ml. of water is sprayed on as mixing continues. After balling of the mixture has occurred, the mix is dried at 135° F., crushed and screened. The granules which pass through a screen having 20 openings per linear inch but are retained on a screen having 40 openings per linear inch are collected. These granules are found to be hard but disintegrate rapidly in water; they contain 1.5% by weight of the pesticide material.

EXAMPLE 3

A mixture of 43.03 lbs. of #1 Terra Alba, 6.62 lbs. of ammonium sulfate, and 1.30 lb. of 50% wettable powder of dimethyl tetrachloroterephthalate is granulated with 3407 ml. of water as in Example 2. The material is dried at 135° F., crushed and screened to obtain granules of between 20 and 40 mesh, as described. The granules are hard and disintegrate rapidly in water. The pesticide content is 1.5% by weight.

EXAMPLE 4

Seventy grams of agricultural gypsum, 10 g. of ammonium sulfate, 10 g. of bentonite, and 10 g. of 50% wettable powder of dimethyl tetrachloroterephthalate are premixed in a cake mixer. Twenty ml. of water is sprayed on and the mixture is stirred until granulation takes place. The granules are dried at 135° F. for two hours, crushed and screened to obtain granules of between 20 and 40 mesh. The granules are hard but disintegrate rapidly in water; they contain 5% by weight of the pesticide.

EXAMPLE 5

By the procedure of Example 4, granules of between 20 and 40 mesh are prepared from 74 g. of agricultural gypsum, 16 g. of potassium sulfate, and 10 g. of 50% wettable powder of dimethyl tetrachloroterephthalate. The granules are hard and disintegrate very rapidly in water. They contain 5% by weight of the pesticide.

EXAMPLE 6

A mixture of 83.4 g. of agricultural gypsum, 3.4 g. of ammonium sulfate, and 13.2 g. of 75% wettable powder of DDT is granulated with 20 g. of water as in Example 4. The resulting granules, between 20 and 40 mesh, containing 10% by weight of DDT, are hard but disintegrate rapidly in water.

EXAMPLE 7

Forty-three grams of agricultural gypsum, 85 g. of aluminum sulfate, and 10 g. of 50% wettable powder of dimethyl tetrachloroterephthalate are granulated with 20 ml. of water in a cake mixer. The granules are dried at 135° F., crushed and screened to obtain granules of between 20 and 40 mesh. The granules are hard, disintegrate very rapidly in water and contain 5% by weight of the pesticidal material.

EXAMPLE 8

*Preparation of 50% wettable powder of 3,3,4,4-tetrachlorotetrahydrothiophene 1,1-dioxide*

| | Parts by weight |
|---|---|
| 3,3,4,4-tetrachlorotetrahydrothiophene 1,1-dioxide | 51.5 |
| Sulfur | 23.5 |
| Terra Alba | 23.5 |
| Surfactant—Nekal BX-78 | 1.0 |
| Dispersing agent—Marasperse N | 0.5 |

The above mixture is ground by a process similar to that described in Example 1.

EXAMPLE 9

By the method of Example 7, granules of between 20 and 40 mesh are prepared from 70 g. of Terra Alba, 10 g. of ammonium sulfate, 20 g. of 50% wettable powder of 3,3,4,4-tetrachlorotetrahydrothiophene 1,1-dioxide, and 15 g. of water. The finished granules contain 10% by weight of the toxicant. Accelerated aging tests at 60° C. show the material to be stable for at least 14 days.

EXAMPLE 10

The formulation is similar to that in Example 9, except that 69 g. of Terra Alba and one g. of sodium alum are employed. This material is also stable over at least 14 days of accelerated aging.

EXAMPLE 11

A mixture of 79.5 g. of Terra Alba, 10 g. of ammonium sulfate, 0.2 g. of Nekal BX-78, 0.1 g. of Marasperse N, and 10.2 g. of technical 3,3,4,4-tetrachlorotetrahydrothiophene 1,1-dioxide is ground and granulated in a cake mixer with 15 g. of water. The material is dried at 135° F., crushed and screened to obtain granules of between 20 and 40 mesh. These granules contain 10% by weight of the pesticide and are stable over at least 14 days of aging at 60° C.

EXAMPLE 12

To show the biological activity of the granular pesticide formulations of the present invention, comparable plots of turf infested with crabgrass are treated with the granules of Example 3. The results are compared, in the following table, with results obtained by treatment with a 50% wettable powder of dimethyl tetrachloroterephthalate.

| Formulation | Dosage, Lbs./Acre | Days After Treatment | Percent Crabgrass Control |
|---|---|---|---|
| Syngenite Granule, 1.5% Toxicant Concentration | 15 | 114 | 94 |
| | | 179 | 96 |
| | 10 | 114 | 75 |
| | | 179 | 96 |
| | 5 | 114 | 87 |
| | | 179 | 97 |
| Wettable Powder, 50% | 15 | 114 | 75 |
| | | 179 | 88 |
| | 10 | 114 | 75 |
| | | 179 | 83 |

It is to be understood that although the invention has been described with specific reference to particular embodiments thereof, it is not to be so limited, since changes and alterations therein may be made which are within the full intended scope of this invention as defined by the appended claims.

What is claimed is:

1. The method of preparing a pesticidal composition which comprises mixing dry calcium sulfate dihydrate, a dry pesticide and a dry material selected from the group consisting of ammonium sulfate, potassium sulfate, aluminum sulfate and urea to form an intimate dry mixture, adding to said dry mixture an amount of water sufficient only to effect pelletizing of said dry mixture, mixing the water and said dry mixture so as to form a sufficient amount of the reaction product of calcium sulfate dihydrate and the material selected from the aforementioned group to form pellets and provide hardness and water disintegration thereto and heating said pellets to a temperature in the range of about 100° to 200° F. to dry the pellets, said pellets having the pesticide intimately and substantially uniformly dispersed therein.

2. The method as claimed in claim 1 wherein the material is ammonium sulfate.

3. The method as claimed in claim 1 wherein the material is potassium sulfate.

4. The method as claimed in claim 1 wherein the material is aluminum sulfate.

5. The method as claimed in claim 1 wherein the material is urea.

6. The method as claimed in claim 1 wherein the pesticide is dimethyl tetrachloroterephthalate.

7. The method as claimed in claim 1 wherein the pesticide is 3,3,4,4-tetrachlorotetrahydrothiophene 1,1-dioxide.

8. The method as claimed in claim 1 wherein the pesticide is 2,2-bis-(p-chlorophenyl)-1,1,1-trichloroethane.

9. The method of preparing a pesticidal composition which comprises forming a dry mixture comprising about 25 to 90 parts by weight of calcium sulfate dihydrate, 1 to 70 parts by weight of a reactive material selected from the group consisting of ammonium sulfate, potassium sulfate, aluminum sulfate and urea, 0 to 20 parts by weight of a swelling agent, 0.5 part by weight of an acidic material selected from the group consisting of sodium hydrogen sulfate, alum and sodium alum and 1 to 30 parts by weight of a pesticide; agitating the dry mixture and adding an amount of water sufficient only to effect pelletizing of said dry mixture, at least a portion of the reactive material dissolving in the water and forming a sufficient amount of reaction product with calcium sulfate dihydrate to form pellets and provide hardness and water disintegration to the pellets and heating the pellets to a temperature in the range of about 100° to 200° F. to dry the pellets, said pellets having the pesticide intimately and substantially uniformly dispersed therein.

10. The method as claimed in claim 9 wherein the reactive material is ammonium sulfate.

11. The method as claimed in claim 9 wherein the reactive material is potassium sulfate.

12. The method as claimed in claim 9 wherein the reactive material is aluminum sulfate.

13. The method as claimed in claim 9 wherein the acidic material is sodium alum.

14. The method as claimed in claim 9 wherein the pellets formed are of a particle size which will pass through a screen having 10 openings per linear inch but which will be retained on a screen having 80 openings per linear inch.

15. The method as claimed in claim 9 wherein the total amount of water used is equal to 5–45% by weight of the dry ingredients.

16. A granular pesticidal composition comprising
(1) calcium sulfate dihydrate;

(2) 1 to 30 percent, by weight, of a pesticide; and (3) the reaction product formed by the addition of water to a dry mixture containing calcium sulfate dihydrate and a reactive material selected from the group consisting of ammonium sulfate, potassium sulfate, aluminum sulfate and urea to dissolve at least a portion of the calcium sulfate dihydrate and the reactive material;

said granular composition having the pesticide intimately and substantially uniformly dispersed therein; said reaction product being present in an amount sufficient to provide hardness and water disintegration to the granules.

17. The composition of claim 16 which contains reactive material in excess of the amount which dissolves in the water added to form the reaction product.

18. A granular pesticidal composition as in claim 16, said granules being of a size which will pass through a screen having ten openings per linear inch but which will be retained on a screen having 80 openings per linear inch.

19. The composition as claimed in claim 16 wherein the reactive material is ammonium sulfate.

20. The composition as claimed in claim 16 wherein the reactive material is potassium sulfate.

21. The composition as claimed in claim 16 wherein the reactive material is aluminum sulfate.

22. The composition in claim 16 wherein the reactive material is urea.

23. The composition as claimed in claim 16 wherein the pesticide is dimethyl tetrachloroterephthalate.

24. The composition as claimed in claim 16 wherein the pesticide is 3,3,4,4-tetrachlorotetrahydrothiophene 1,1-dioxide.

25. The composition as claimed in claim 16 wherein the pesticide is 2,2-bis-(p-chlorophenyl)-1,1,1-trichloroethane.

26. The composition of claim 16 wherein the pesticide is selected from the group consisting of
2,2-bis-(p-chlorophenyl)-1,1,1-trichloroethane
2,4-dichlorophenoxyacetic acid
isopropyl ester of 2,4-dichlorophenoxyacetic acid
2,4,5-trichlorophenoxyacetic acid
1,2,3,4,10,10 - hexachloro - exo - 6,7 - epoxy - 1,4,4a, 5,6,7,8,8a - octahydro - 1,4,5,8 - endo,exo - dimethanonaphthalene
sodium 2,4-dichlorophenoxyethyl sulfate
1,2,3,4,10,10 - hexachloro - exo - 6,7 - epoxy - 1,4,4a, 5,6,7,8,8a - octahydro - 1,4,5,8 - endo,endo - dimethanonaphthalene
1,4,5,6,7,8,8 - heptachloro - 3a,4,7,7a - tetrahydro - 4,7-endo-methanoindene
S - (1,2 - dicarbethoxyethyl) - O,O - dimethylphosphorodithioate
O-p-nitrophenyl-O,O-diethyl phosphorothioate dimethyl dichlorovinyl phosphate
p-chlorophenyl-p-chlorobenzenesulfonate
gamma-1,2,3,4,5,6-hexachlorocyclohexane
sodium 2,4,5-trichlorophenoxyethyl sulfate
3,4-dichlorotetrahydrothiophene 1,1-dioxide
3,3,4,4-tetrachlorotetrahydrothiophene 1,1-dioxide and
dimethyl tetrachloroterephthalate.

References Cited by the Examiner

UNITED STATES PATENTS

| | | | |
|---|---|---|---|
| 2,330,234 | 9/43 | Moyle | 167—42 |
| 2,809,469 | 10/57 | Hartley | 47—48.5 |
| 3,048,516 | 8/62 | Mosca | 167—14 |

OTHER REFERENCES

Shell Handbook, "Handbook of Aldrin, Dieldrin and Endrin Formulations," published by Shell Chemical Corp., 460 Park Ave., New York 22, New York, December 1954 (2nd printing) pages 21–37 and 51–59.

JULIAN S. LEVITT, *Primary Examiner.*

FRANK CACCIAPALIA, Jr., LEWIS GOTTS,
*Examiners.*